United States Patent
Dam

(10) Patent No.: US 7,617,739 B1
(45) Date of Patent: Nov. 17, 2009

(54) NON-INVASIVE ULTRASONIC SYSTEM TO DETERMINE INTERNAL PRESSURE IN FLEXIBLE TUBING

(75) Inventor: Naim Dam, Muttontown, NY (US)

(73) Assignee: Cosense Inc., Hauppauge, NY (US)

( * ) Notice: Subject to any disclaimer, the term of this patent is extended or adjusted under 35 U.S.C. 154(b) by 71 days.

(21) Appl. No.: 11/983,328

(22) Filed: Nov. 8, 2007

(51) Int. Cl.
*G01F 1/66* (2006.01)
(52) U.S. Cl. .................................................. 73/861.27
(58) Field of Classification Search ........................ None
See application file for complete search history.

(56) References Cited

U.S. PATENT DOCUMENTS

| | | | | |
|---|---|---|---|---|
| 4,807,479 | A * | 2/1989 | Sako et al. | 73/730 |
| 5,031,460 | A * | 7/1991 | Kanenobu et al. | 73/730 |
| 6,030,343 | A * | 2/2000 | Chechersky et al. | 600/399 |
| 7,109,720 | B2 * | 9/2006 | Baurand et al. | 324/421 |
| 7,240,553 | B2 * | 7/2007 | Segura et al. | 73/597 |
| 7,290,450 | B2 * | 11/2007 | Brown et al. | 73/579 |

FOREIGN PATENT DOCUMENTS

JP        2001165748     * 6/2001

OTHER PUBLICATIONS

J. Webster (ed.), Wiley Encyclopedia of Electrical and Electronics Engineering, Flowmeters, Copyright # 1999 John Wiley & Sons, Inc.*

J. Webster (ed.), Wiley Encyclopedia of Electrical and Electronics Engineering, Pressure Sensors. Copyright_c 1999 John Wiley & Sons, Inc.*

* cited by examiner

*Primary Examiner*—Harshad Patel
(74) *Attorney, Agent, or Firm*—Gordon D. Coplein

(57) ABSTRACT

A system for determining pressure change in a liquid flowing in a tube of an elastic material has a sensor head having a slot and a pair of piezoelectric elements mounted in opposing walls of said slot between which the tube is placed in contact with the opposing elements. An electronic circuit generates periodic bursts of electro-mechanical energy from one of the elements that is transmitted through the tube to be received by the other element to be converted to an electrical signal from which is measured the travel time value of the energy through the tube and liquid therein and the amplitude value of the received signal which values are compared to at least one of base line travel time and amplitude values to determine a change of pressure of the liquid flowing in the tube.

21 Claims, 6 Drawing Sheets

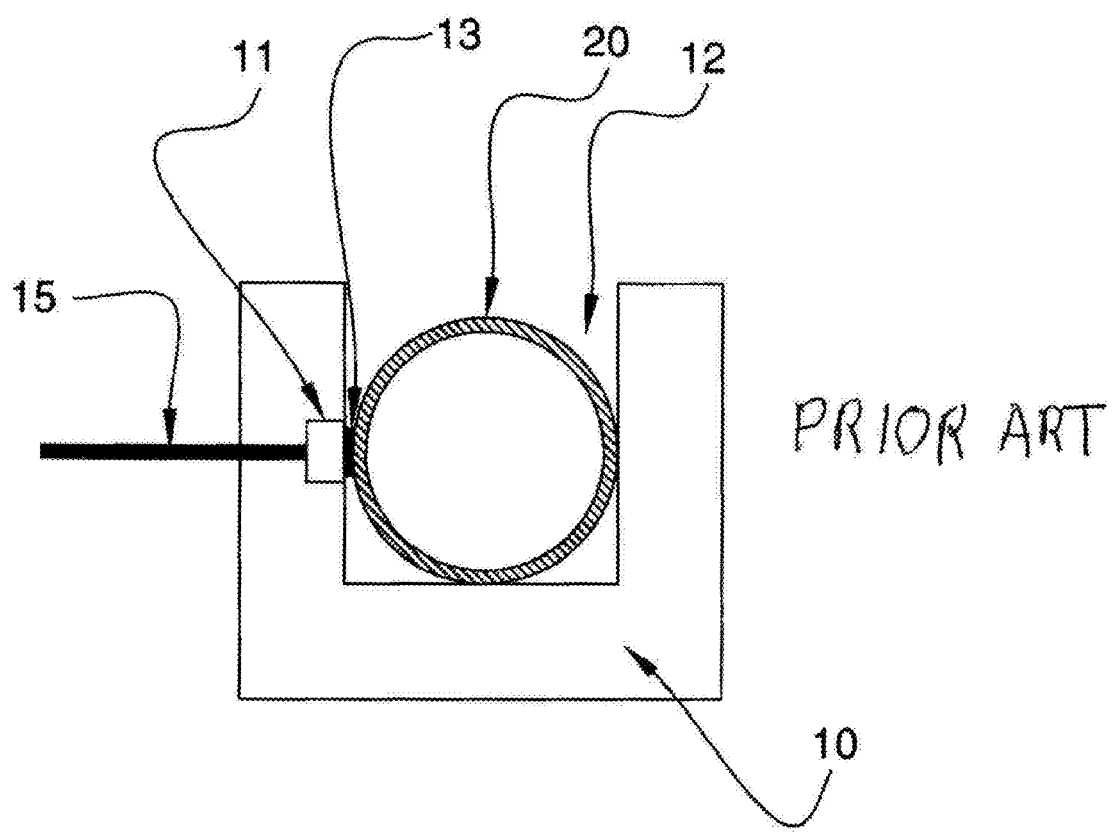
FIGURE: 1

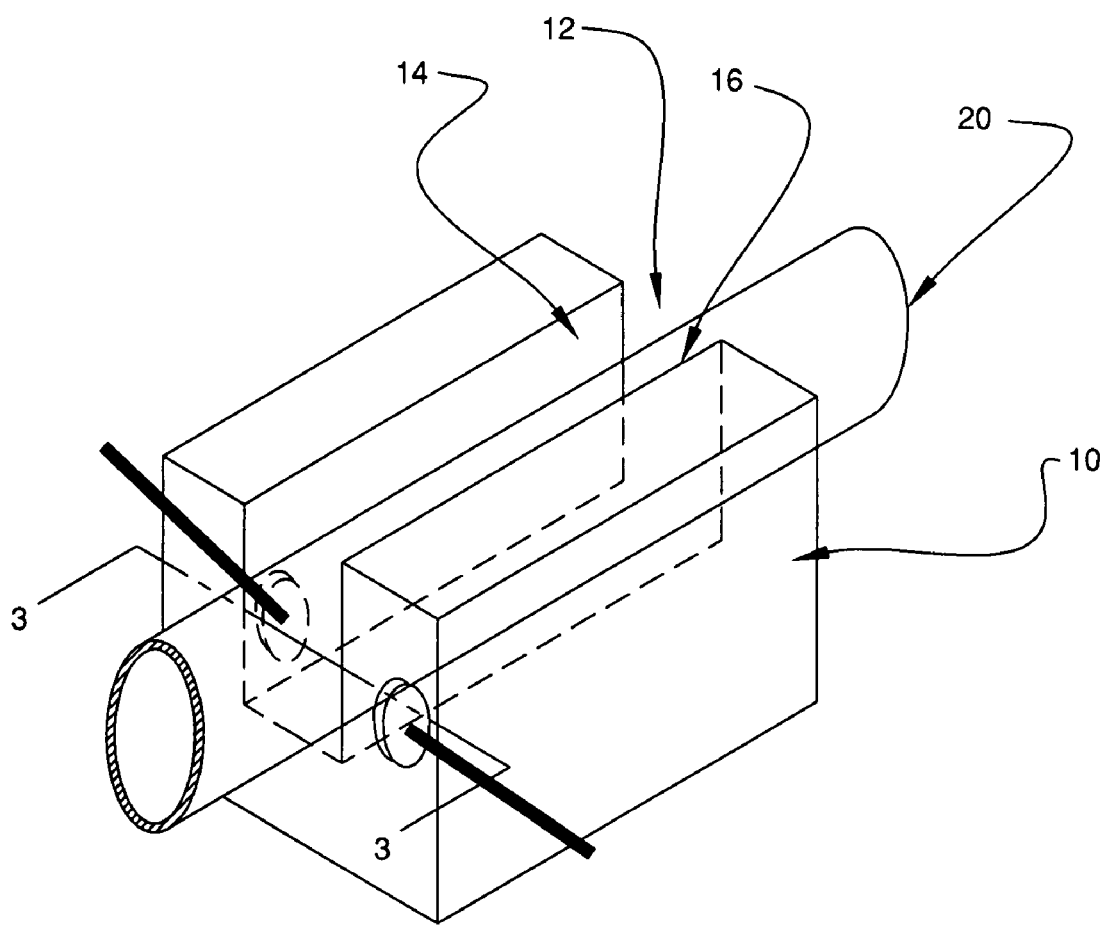
FIGURE: 2

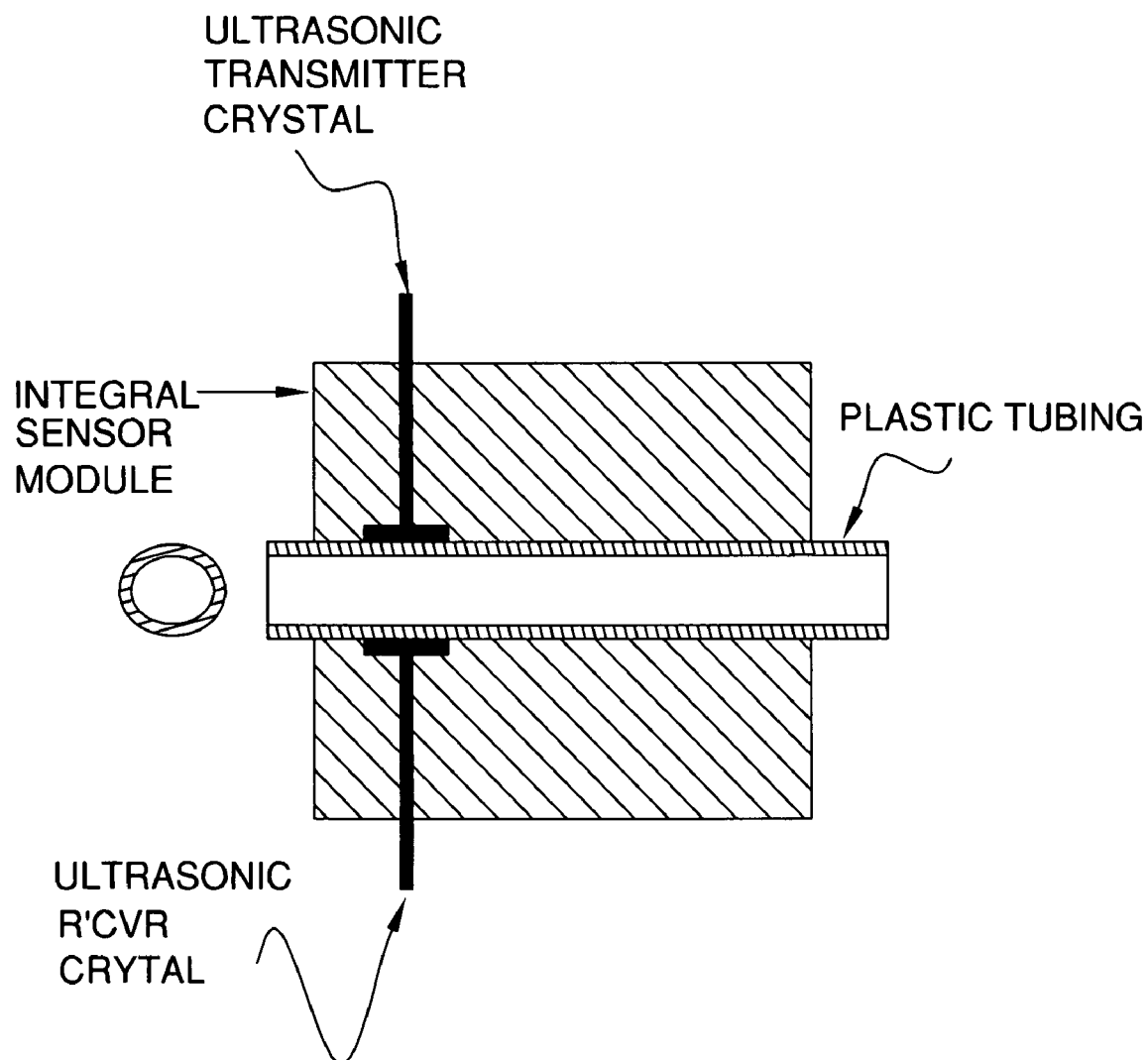
FIGURE: 3

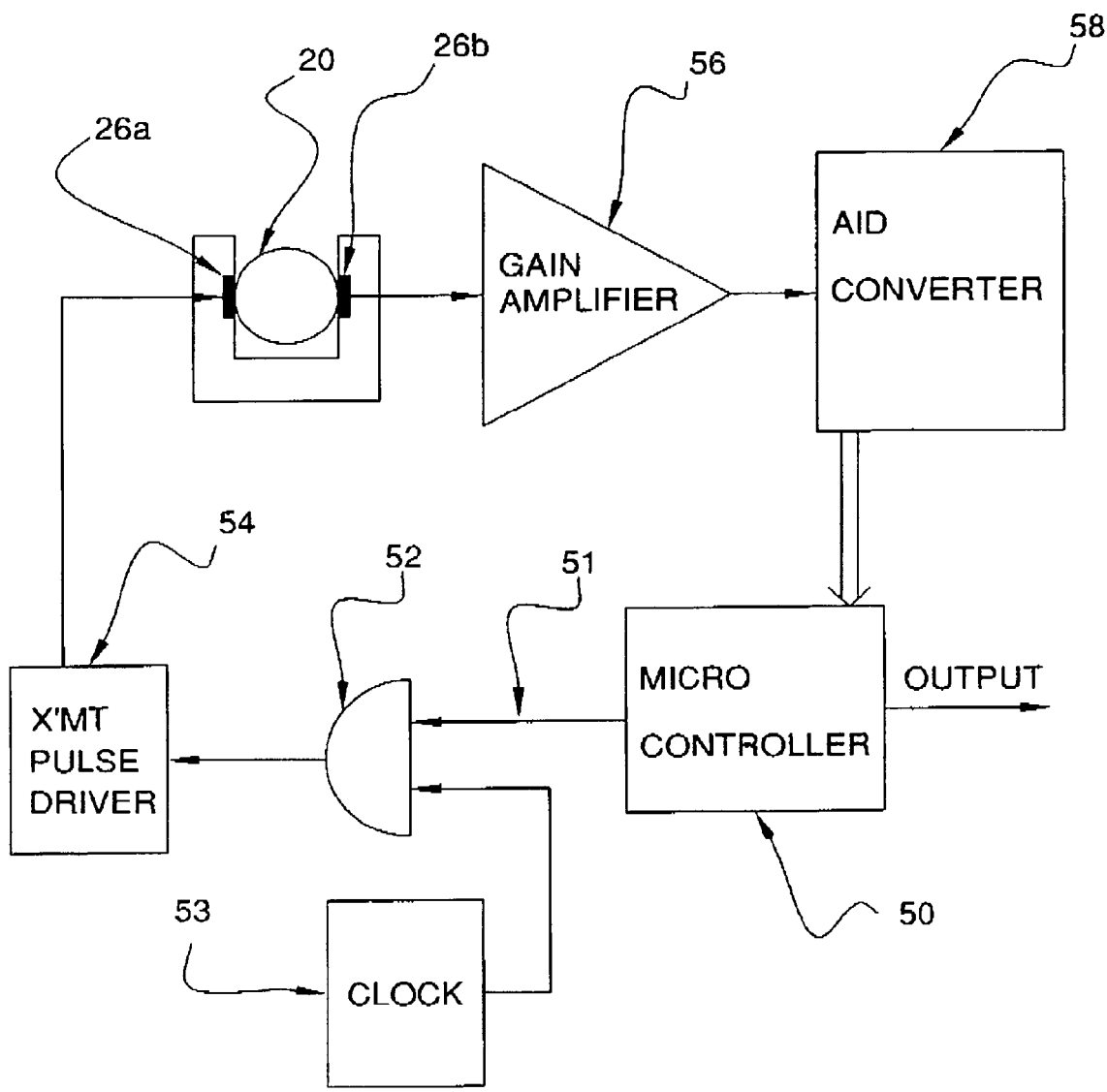
FIGURE: 4

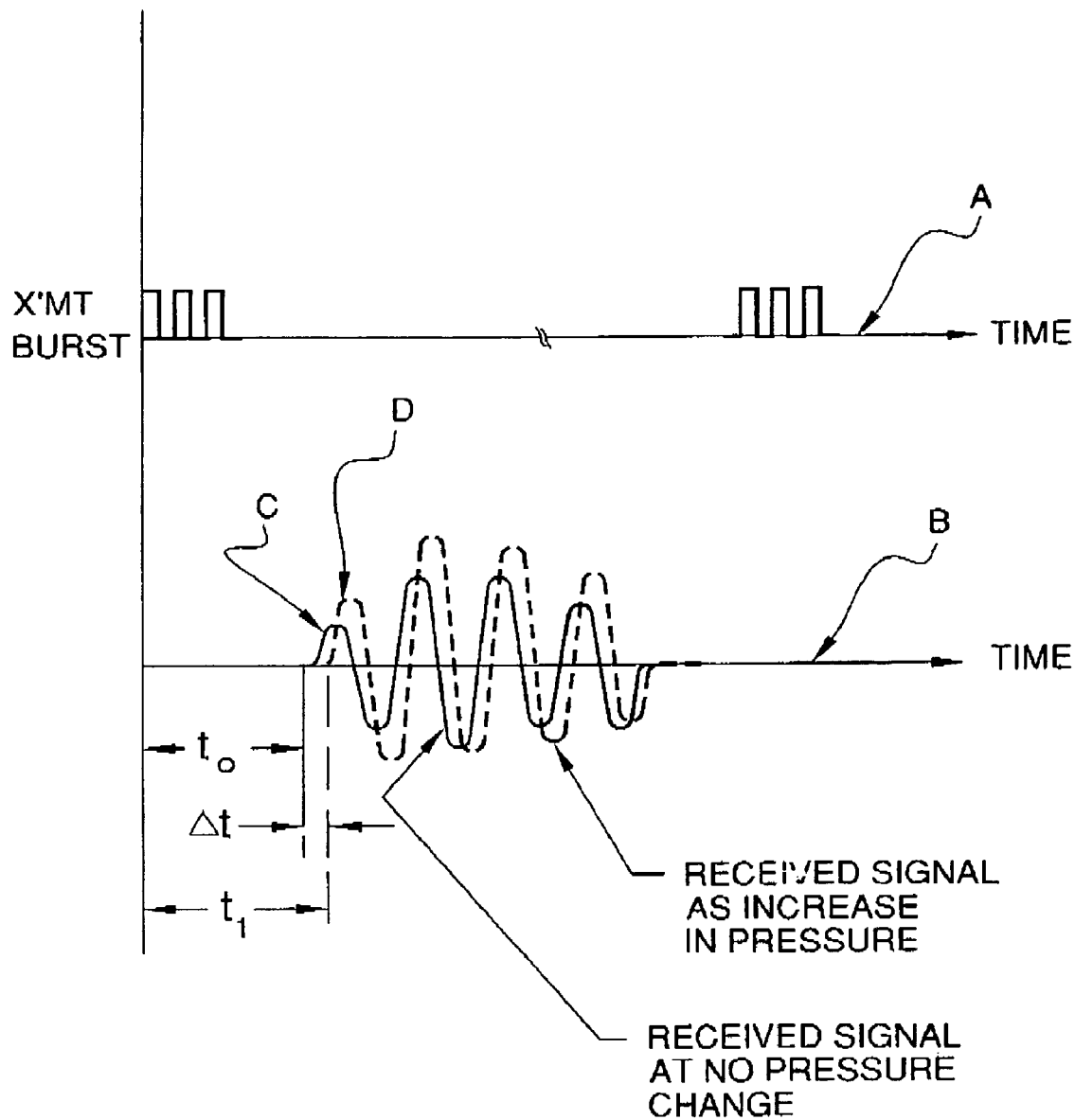
FIGURE: 5

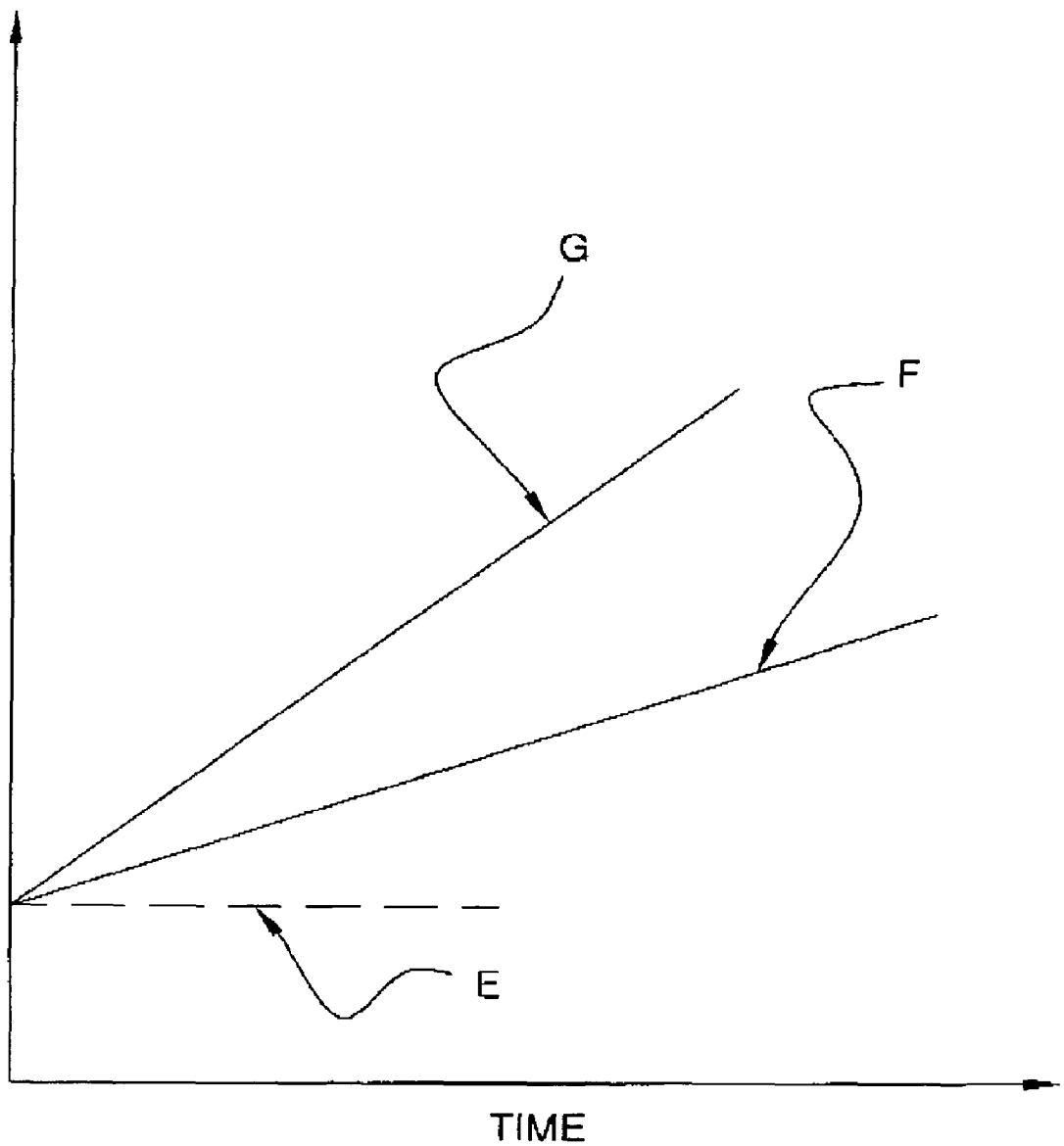
FIGURE: 6

NON-INVASIVE ULTRASONIC SYSTEM TO DETERMINE INTERNAL PRESSURE IN FLEXIBLE TUBING

FIELD OF THE INVENTION

The present invention relates to a system using a non-invasive ultrasonic technique to determine internal pressure of a fluid flowing in a flexible tubing.

BACKGROUND OF THE INVENTION

In pharmaceutical and medical industries a need exists to determine the pressure of a liquid flowing in a tube or tubing. In such applications the tube is usually of an elastic compressible and expandable material, such as silicone, vinyl plastic, polyethylene or flexible type TEFLON. Determination of the fluid pressure provides useful information regarding presence of flow of the liquid and operation of a pumping mechanism that might be used to supply the liquid in the tube.

Several prior art techniques exist for measuring internal pressure of a liquid flowing in a tube of elastic material on a non-invasive basis, that is, without having to have a component of the instrument come into contact with the liquid. One of these relies on the deformation of the tube wall and another on a means of modifying the liquid parameters by using a penetrating radiation technique. Considering the first of these techniques by referring to FIG. 1, a strain gage, or force, sensor 11 is mounted in a head 10 having a slot 12 in which the tube 20 is placed. As is known, a strain gage is a device whose resistance changes in response to the force that it senses. The strain gage 11 usually has a soft front face 13 made of silicon rubber, which is commercially available, for coupling with the tube 20 outer wall. A lead 15 extends through the head 10 to connect the strain gage to a suitable conventional electronic circuit.

The tube 20 is generally circular and is placed in the slot 12 with only a slight deformation between the slot 12 side walls so as to engage the strain gage 11 outer face. A change in the pressure of the liquid flowing in the tube causes the tube wall to deform. For example, as the pressure increases the tube assumes a somewhat more elliptical shape. The strain gage senses this and causes a change in its resistance which is converted to an electrical signal by an electronic circuit, such as a resistance bridge, and the signal is amplified by an amplifier to a measurable voltage level. The analog voltage level is usually converted to a digital number that displays the amount of force sensed.

The force sensing technique depends on tube material for expansion and contraction. Therefore, each different tube material type and wall thickness has to be calibrated for a specific size and characterized by its deformation properties. Instruments using a penetrating energy technique are relatively expensive and sometimes difficult to operate. Therefore a need exists for another technique that can measure the internal pressure of a liquid flowing in a tube.

BRIEF DESCRIPTION OF THE INVENTION

The present invention provides a system for determining a change in pressure of a liquid flowing in a tube of an elastic material. A non-invasive sensor is used that is formed by a sensor head having a slot with opposing side walls in which a pair of piezoelectric elements are mounted opposing each other. One of the elements serves as a transmitter of ultrasonic energy and the other as a receiver. The tube is placed in the slot in contact with the outer faces of the opposing elements. Liquid is supplied to the tube from an external source such as a suspended bag of a solution or from a pump.

An electronic circuit, which preferably is microprocessor controlled, operates a driver to supply periodic bursts of signals to the piezoelectric transmitter element which transmits electro-mechanical energy through the tube and any liquid therein to be received by the other piezoelectric element which converts the received energy to an electrical signal. The electrical signal as compared to the time of transmission of the energy burst gives information of the travel time of the energy through the tube and liquid. The amplitude of the received signal corresponds to the effectiveness of transmission which is a function of the engagement of the tube with the elements. The travel time and amplitude values are converted to digital values that are processed by the microprocessor and compared to static base line travel time and amplitude values of liquid flowing in the tube at a known pressure or no liquid in the tube to determine a change of pressure of liquid flowing in the tube. Each of the differences of travel time and amplitude to the base line values can be used to determine the occurrence and/or numerical value, in psi or other unit, of the pressure change. In a preferred embodiment of the invention a cross correlation technique can be used to obtain an average between the two numerical values. The base line values also can be dynamic as measured from travel time and amplitude values obtained on a recurring basis from previous bursts of the transmitted energy.

Accuracy of the pressure measurement is enhanced by providing the base line values with information of the creep of the material of the tube.

BRIEF DESCRIPTION OF THE DRAWINGS

Other objects and advantages of the present invention will become more apparent upon reference to the following specification and annexed drawings, in which:

FIG. 1 is a side elevational view of a prior art device using a strain gage, or force, sensor;

FIG. 2 is a perspective view of the sensor head having ultrasonic transmitter and receiving crystal elements;

FIG. 3 is a top view in cross-section of the sensor head along lines 3-3 of FIG. 2;

FIG. 4 is a block diagram of the system electronics;

FIG. 5 is a timing diagram showing the change in amplitude and shift in ultrasonic energy travel time due to a change in internal tube fluid pressure; and FIG. 6 is a graph illustrating rate of change of tube deformation due to tube creep and pressure change.

DETAILED DESCRIPTION OF THE INVENTION

Referring to FIGS. 2 and 3 the system has a sensor head 10 similar to that described with respect to FIG. 1. The head 10 of the non-invasive sensor is a block of a plastic material such as UDELL polysulfone resin manufactured by Solvay Advanced Polymers. The head 10 is illustratively shown as being of a generally rectangular shape and can be molded by any suitable technique. In the head 10 there is a longitudinal slot 12 that has opposing side walls 14 and 16. A tube 20 of flexible and elastically outwardly expansible material having a liquid flowing in it is to be placed in the slot 12. Typical materials for the tube are silicone, vinyl plastic, polyethylene or flexible TEFLON, with the latter two materials being somewhat more rigid than the first two. The tube 20 typically is to have one end connected to the body of a patient and the other end connected to a liquid supply, such as a medicine or saline solution in a suspended bag, or to a machine such as a dialysis machine or a blood pump.

In the molding of the head 10 a pair of depressions are preferably formed in the opposing slot side walls 14 and 16 in which piezoelectric sensor elements, or crystals, are to be mounted. The slot side wall thickness is typically 0.30" to 0.050" depending upon the diameter of the tube used. A hole is drilled through the outside walls of the head 10 to each of the depressions in the slot sidewalls 14 and 16 to accommodate a respective lead wire or wires connected to the respective sensor element.

A pair of piezoelectric elements 26a and 26b are mounted opposing each other in the depressions in the opposing slot side walls 14 and 16. The front face of each element preferably extends out of the side wall for a small distance. One of the piezoelectric elements 26a acts as a transmitter of ultrasonic energy and the other 26b as a receiver of the transmitted energy. Both piezoelectric elements are of commercially available PZT type material or other suitable piezoelectric material. In a preferred embodiment of the invention the transmitter element 26a is supplied energy at an operating frequency range from 2 MHZ to 5 MHZ.

In using the sensor head 10, the plastic tube 20 is laid in the slot 12. The width of the slot 12 is slightly less than the outer diameter of the plastic tube 20 so that the front faces of the piezoelectric elements 26a and 26b mounted in the opposing slot side walls 14 and 16 make contact with the tube 20. A typical deformation, or squeeze, of the tube in the slot would be 15% to 20% of the tube outer diameter. This arrangement permits satisfactory operation of the piezoelectric elements without the use of a coupling compound such as petroleum jelly. Also, no soft face is needed for the elements such as is needed for the strain gage. The elements 26a and 26b are preferably mounted so as to engage the widest cross dimension, or diameter, of the tube 20 when it is laid in the slot 12. As described below, there is further deformation of the tube wall depending upon the internal pressure of the liquid flowing in the tube. That is, as the tube internal liquid pressure increases the tube wall will deform and more firmly engage the faces of the opposing piezoelectric elements.

FIG. 4 shows the electronic components of the system. There is a microprocessor 50 that is suitably programmed to perform all of the functions described below. An output of the microprocessor on line 51 is supplied to one input of an AND gate 52 whose other input is from a clock pulse generator 53. The microprocessor periodically gates open the AND gate 52 for a predetermined time so that bursts of the clock pulses, which illustratively are at a frequency of 2-5 MHZ, are applied to a transmitter pulse driver 54 which supplies pulses of electrical energy to the transmitter piezoelectric element, here shown as element 26a. Element 26a converts the electrical energy to electro-mechanical energy which is transmitted through the wall of the tube 20, through the interior of the tube and any liquid flowing through it, and out through the other side of the tube to be received by the piezoelectric receiving element 26b. Element 26b converts the electro-mechanical energy to an electrical signal that is amplified by a high gain amplifier 56. As discussed below, the travel time of the energy between the two elements 26a and 26b and the amplitude of the signal at the amplifier 56 is related to the pressure of the liquid flowing in the tube 20. The analog output signal from amplifier 56 is applied to the input of an analog to digital converter 58 whose output is supplied to the microprocessor 50 for processing. The microprocessor has an output that can be to a visual display, alarm or another signal line.

FIG. 5 shows the operation of the system to measure pressure changes of the liquid in the tube 20. The top line A of elapsed time shows the bursts of energy applied to the transmitter piezoelectric element 26a when the AND gate 52 of the circuit of FIG. 4 is gated open. During the time between the bursts, the energy transmitted from piezoelectric element 26a travels through the tube 20 and is received by the piezoelectric element 26b. The lower line B of elapsed time shows the travel time of the energy and the amplitude of the received signal. The travel time is measured by the microprocessor 50 using its internal clock starting from the transmission of cycle of the transmitted energy burst.

The solid line C shows the received signal at the output of the element 26b when the pressure of the liquid in the tube 20 is steady. As seen from line C, the transmitted energy is received after a travel time $t_0$ through the tube. The received signal is amplified by the amplifier 56 of FIG. 4 and applied to the analog to digital converter 58. The digital values of the travel time $t_0$ and the amplitude of curve C are applied to the microprocessor 50 and stored as base line values.

Consider now the situation that the pressure of the liquid in tube 20 increases. This causes the tube 20 to expand resulting in two effects. First, the tube 20 outer wall will make a more firm contact with the faces of the piezoelectric elements 26a and 26b. This causes a self amplifying effect of the signal produced by the receiving piezoelectric element 26b due to a greater area of surface contact between the tube wall and the faces of the elements 26a and 26b. That is, the transmission of the energy is more effective. Second, since the distance though which the ultrasonic energy travels between the two elements 26a and 26b increases due to the expansion of the tube, the travel time of the ultrasonic energy through the tube increases. This is shown by the dotted line D of FIG. 4. As seen, the signal resulting from a pressure increase is received at time $t_1$ which is later than the time $t_0$. This gives a travel time difference of $\Delta t$ between the different tube internal liquid pressures. Also, the amplitude of the signal of line D is greater than that of line C. The signal of line D, which includes its travel time and amplitude, is digitized by the analog to digital converter 58 and applied to the microprocessor 50. The digital values $\Delta t$ and the signal amplitudes of lines C and D are available for processing by the microprocessor 50 and each can be converted to a pressure change value. The signal amplitude and travel time are determined by the microprocessor 50 periodically at every energy burst transmit cycle. As noted above, the microprocessor also has stored initial base line values of the signal at a normal internal pressure of the liquid. If desired, these initial values can be pre-programmed into the microprocessor. The timing difference $\Delta t$ between signals at normal and increased pressure can be very precisely computed. A small change in amplitude of the signals also can be measured. That is, each of the differences of travel time and amplitude to the base line values can be used to determine the occurrence and/or numerical value, in psi or other unit, of the pressure change. In a preferred embodiment of the invention a cross correlation technique can be used by the microprocessor to obtain an average between the two numerical values.

A display (not shown) also can be operated by the microprocessor 50 to display the measured pressure value, that is, the change from the base line value. In some applications, it is only necessary to show that a pressure change has occurred and the numerical amount of change is not of importance.

It should be seen that only one difference between a measured value and a base line value determines that a pressure change has occurred. That is, a change in either of travel time or amplitude from its corresponding base line value indicates that a pressure change has occurred in the tube. Use of both values provides redundancy and also allows for the value of the pressure change to be more accurately computed.

In the above description the base line values of signal travel time and amplitude used by the microprocessor are those of liquid flowing in the tube at a normal pressure. The base line values also can be those taken when there is no liquid flowing in the tube. However, this limits the system to detecting only increases in the internal liquid pressure.

In some applications a user might want only to monitor continuing, or dynamic, changes in pressure. In this case, shifting or dynamic base line values would be used as compared to the static values described above. That is, the microprocessor would make a comparison based on the travel time and amplitude values determined for a burst of ultrasonic energy transmitted during a prior cycle. It also is possible to use firm initial base line values and shifting values to provide both changes from the initial base line values and continuing dynamic pressure changes.

The microprocessor also can be programmed to increase pressure change measurement accuracy by providing it with data of tube "creep". All of flexible material exhibit a creep behavior due to a material relaxation phenomena. This is shown in FIG. 6. When a flexible tube inserted in slot 12 is filled with liquid, the amplitude of the signal received by piezoelectric crystal receiver element 26b is at fixed DC voltage, represented by the line E of FIG. 6. As the tube stays in the slot, over the course of time the wall of a tube expands and more firmly engages the slot side walls and the piezoelectric elements. This results in an increase in received signal amplitude as a function of a time, which is represented by line F. The tube wall relaxation also continues to occur during the tube internal pressure change but at a greater rate as shown by line G of FIG. 6. The degree of the slope of lines F and G is illustrative and varies depending upon the characteristics of tube material. Measurements of the rate of change in signal amplitude due to pressure change vs creeping phenomena can be used to refine the base line pressure measurement values and the dynamic values.

A case study was conducted using silicone tubing having an outside diameter of 4.5 mm and a wall thickness of 0.8 mm. The change in signal amplitude caused by tube creep behavior was observed to be 0.75 mv/hr. The rate of change of signal amplitude output as a function of change in pressure was 20 mv/min. This was observed using a 2.25 MHZ frequency and 1.0 volt peak to peak driving voltage applied to the piezoelectric transmitter element 26a.

The creep signal information for a given tube would be determined and would be programmed into the microprocessor, such as by being added to the static or dynamic base line values, to be used to refine the measurement of both the signal travel time and amplitude.

The ultrasonic system of the invention also provides other useful information of operation in addition to determining a change in pressure. Referring to FIG. 6, the constant output voltage of line E is indicative of a proper functional behavior of a complete system. For example, if a piezoelectric crystal element or electronic circuit component failed or the tube was not in the slot, then the DC signal would not be present. This provides a continuous self check of proper system operation.

The ultrasonic of the invention is based on the rate of propagation of ultrasonic energy inside the liquid. It measures both amplitude and time shift and calculate the change of fluid pressure. Also it does not require the soft front face of a strain gage to couple with the tubing.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A system for determining change in pressure of a liquid flowing in a tube of an elastic material that has a base line value for travel time of an electro-mechanical energy signal transmitted through the tube due to one of pressure of the liquid of a known value flowing in the tube or no liquid flowing in the tube acting against the tube elastic material, comprising:
    a pair of piezoelectric elements between which the tube is placed with said elements opposing each other generally transverse to the direction of liquid flowing in the tube;
    a circuit for storing said base line travel time value; and
    an electronic circuit for
    providing periodic bursts of signals to one of said pair of elements to transmit electro-mechanical energy through the tube wall into and across its interior and any liquid flowing therein and out the tube wall to be received by the other of said pair of elements to be converted to an electrical signal,
    measuring the travel time value of said energy through the tube from the electrical signal, and
    comparing the measured travel time value that changes due to the pressure of the liquid flowing in the elastic tube causing it to expand or contract to the stored base line travel time value to determine a change of pressure of liquid flowing in the tube from that which would be flowing as measured by said travel time base line value.

2. The system as claimed in claim 1 further comprising a sensor head having a slot and said pair of piezoelectric elements mounted opposing each other in opposing walls of said slot, the tube to be laid in the slot under compression in said slot between said piezoelectric elements.

3. The system as claimed in claim 1 wherein said travel time base line value corresponds to liquid flowing through said tube at a steady pressure.

4. The system as claimed in claim 1 wherein said travel time base line value varies.

5. The system as claimed in claim 1 wherein said travel time base line value corresponds to no liquid flowing through the tube.

6. The system as claimed in claim 1 wherein said travel time base line value is held fixed.

7. The system as claimed in claim 1 wherein said electronic circuit determines said travel time base line value on a recurring basis based on previous bursts of transmitted energy.

8. The system as claimed in claim 1 wherein said electronic circuit further determines a change in the measured travel time base line value in response to creep of the elasticity characteristic of the tube which modifies said travel time base line value.

9. The system as claimed in claim 1 wherein said electronic circuit comprises a microprocessor that controls generation of said bursts of electro-mechanical energy and compares said measured travel time value with the stored travel time base line value to determine a pressure change.

10. The system as claimed in claim 9 wherein said microprocessor computes the amount of pressure change based on said comparison.

11. The system as claimed in claim 1 wherein said circuit for storing said travel time base line value also stores a base line value for the amplitude of the electro-mechanical energy signal transmitted through the tube due to one of pressure of the liquid of a known value flowing in the tube or no liquid flowing in the tube;

and wherein said electronic circuit compares at least the measured travel time value to the corresponding stored base line travel time value to determine a change of pressure of liquid flowing in the tube from that which would be flowing as measured by said travel time base line value.

12. The system as claimed in claim 11 wherein both said travel time and amplitude base line values correspond to liquid flowing through said tube at a steady pressure.

13. The system as claimed in claim 11 wherein both said travel time and amplitude base line values vary.

14. The system as claimed in claim 11 wherein both said travel time and amplitude base line values correspond to no liquid flowing through said tube.

15. The system as claimed in claim 11 wherein both said travel time and amplitude base line values are held fixed.

16. The system as claimed in claim 11 wherein said electronic circuit determines both said travel time and amplitude base line values on a recurring basis based on previous bursts of transmitted energy.

17. The system as claimed in claim 11 wherein said electronic circuit further determines a change in the measured travel time and signal amplitude values in response to creep of the elasticity characteristic of the tube and said change in base line values caused by the creep is used by said microprocessor to compute the pressure change.

18. The system as claimed in claim 11 wherein both said measured travel time and amplitude values are compared with its respective base line value to determine the value of the pressure change.

19. The system as claimed in claim 11 wherein said electronic circuit comprises a microprocessor that controls generation of said bursts of electro-mechanical energy and compares at least said measured travel time value with the stored travel time base line value to determine a pressure change.

20. The system as claimed in claim 19 wherein said microprocessor is pre-programmed with both said travel time and amplitude base line values.

21. A method for determining change in pressure of a liquid flowing in a tube of an elastic material comprising the steps of:

establishing a base line value for travel time of an electro-mechanical energy signal transmitted through the tube due to one of pressure of the liquid of a known value flowing in the tube or no liquid flowing in the tube acting against the tube elastic material;

storing said base line travel time value;

providing a pair of opposing spaced apart piezoelectric elements and placing the tube between said opposing elements with said elements of said pair being generally transverse to the direction of liquid flowing in the tube;

providing periodic bursts of signals to one of said pair of elements to transmit electro-mechanical energy through the tube wall into and across its interior and any liquid flowing therein and out the tube wall to be received by the other of said pair of elements to be converted to an electrical signal, measuring the travel time value of said energy through the tube from the electrical signal; and comparing the measured travel time value that changes due to the pressure of the liquid flowing in the elastic tube causing it to expand or contract to the stored base line travel time values to determine a change of pressure of liquid flowing in the tube from that which would be flowing as measured by said travel time base line value.

* * * * *